(12) United States Patent
Laonipon et al.

(10) Patent No.: US 7,512,606 B2
(45) Date of Patent: Mar. 31, 2009

(54) DATABASE CONTENTION AND DEADLOCK DETECTION AND REDUCTION WITHIN APPLICATION SERVERS

(75) Inventors: Bert Vincent Laonipon, Raleigh, NC (US); Robbie John Minshall, Chapel Hill, NC (US); Carolyn Haibt Norton, Apex, NC (US); Srinvasan K. Rangaswamy, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 11/095,985

(22) Filed: Mar. 31, 2005

(65) Prior Publication Data
US 2006/0224588 A1    Oct. 5, 2006

(51) Int. Cl.
*G06F 17/30* (2006.01)
(52) U.S. Cl. .................. 707/8; 707/202; 718/105
(58) Field of Classification Search .......... 707/8, 707/10, 201; 718/100, 105
See application file for complete search history.

(56) References Cited

U.S. PATENT DOCUMENTS

| 5,175,852 | A | 12/1992 | Johnson et al. .......... 395/600 |
| 5,377,351 | A | 12/1994 | Kotera et al. .......... 395/650 |
| 5,787,409 | A | 7/1998 | Seiffert et al. .......... 706/45 |
| 5,913,060 | A | 6/1999 | Discavage .......... 395/680 |
| 2005/0183084 | A1* | 8/2005 | Cuomo et al. .......... 718/100 |
| 2006/0064426 | A1* | 3/2006 | Barsness et al. .......... 707/100 |

* cited by examiner

*Primary Examiner*—Cam-Linh Nguyen
(74) *Attorney, Agent, or Firm*—Duke W. Yee; Bruce Clay; Catherine K. Kinslow

(57) ABSTRACT

A method in a data processing system for detecting and reducing database contention and deadlock caused from within an application server. A determination is made as to whether a set of parameters in a statistical model indicates contention. If the set of parameters in the statistical model indicates contention, an application server administrator is notified of the contention and the number of threads in an application server pool is reduced. If the set of parameters in the statistical model indicates contention is reduced, the number of threads in the application server pool is increased.

9 Claims, 3 Drawing Sheets

US 7,512,606 B2

DATABASE CONTENTION AND DEADLOCK DETECTION AND REDUCTION WITHIN APPLICATION SERVERS

BACKGROUND OF THE INVENTION

1. Technical Field

The present invention relates generally to an improved data processing system and, in particular, to a method, system and computer program product for optimizing performance in a data processing system. Still more particularly, the present invention provides a method, system, and computer program product for enhancing performance by detecting and reducing database contention and deadlock caused from within an application server.

2. Description of Related Art

An application server is a program that handles all application operations between users and an organization's back-end business applications or databases. Application servers are typically used for complex transaction-based applications. The application server works as a translator, allowing, for example, a customer with a browser to search an online retailer's database for pricing information. To support high-end needs, an application server has to have built-in redundancy, monitors for high-availability, high-performance distributed application services and support for complex database access. Many application servers also offer features such as transaction management, clustering and failover, and load balancing.

As the flow of transactions in application server software running on application server hardware increases, the applications can introduce deadlocks, or serious contention issues in the database. Deadlock occurs when two processes that are sharing some resource, such as read access to a table, but then both decide to wait for exclusive access, such as write access. Contention is competition for resources that results in delayed access to resources. Such contention in the database can cause the application server to perform very poorly.

The increase in transactions can introduce a performance problem in the database, a component that the application developer and the application server administrator do not have good knowledge about or control over. The application developer may not even be aware of the major contention issues and only may be aware that an application is not scaling under load. If the database administrator is made aware of the problem, then the administrator can usually determine where in the database the problem lies, but it is difficult for the database administrator to understand or solve the problem where it originated, in the application server.

Customers need a solution that detects contention issues before a crisis occurs and then alerts the application server administrator, while keeping the applications functional.

Current solutions to the performance problems alone include code analysis, detection procedures, and transaction rollbacks. Because code analysis to detect deadlock potential does not happen during runtime, it does not provide an adequate solution. Code analysis focuses on obvious deadlocks caused by poor coding practices, which are different from deadlocks introduced through non-optimal tuning.

Procedures and code execution for database deadlock detection are normally conducted by database administrators and are not a part of the application server. A database administrator can often devise database solutions, but such solutions are usually not runtime changes. Database administrators may not communicate a problem to the application server administrator, and will seldom be motivated to make simple effective tuning changes with the application server.

A transaction rollback occurs when the application server administrator receives SQL code for a deadlock. This solution does not handle contention, and is not clean. Deadlocks and contention issues tend to pile up on each other and it is unlikely that the application server administrator will have the knowledge (or the time if they are debugging a deadlock) to tune the application server in a way that will reduce deadlock potential while the situation is resolved.

None of the current solutions deal with contention issues that do not ultimately result in a deadlock. Therefore, it would be advantageous to have an improved method, system, and computer program product for detecting and reducing contention and deadlock caused from within an application server.

BRIEF SUMMARY OF THE INVENTION

The present invention provides a method, system, and computer program product in a data processing system for detecting and reducing database contention and deadlock caused from within an application server. A determination is made as to whether a set of parameters in a statistical model indicates contention. If the set of parameters in the statistical model indicates contention, an application server administrator is notified of the contention and the number of threads in an application server pool is reduced. If the set of parameters in the statistical model indicates contention is reduced, the number of threads in the application server pool is increased.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
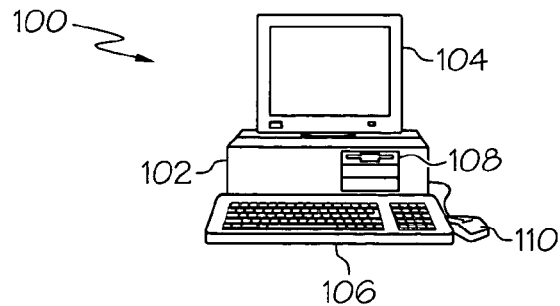
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
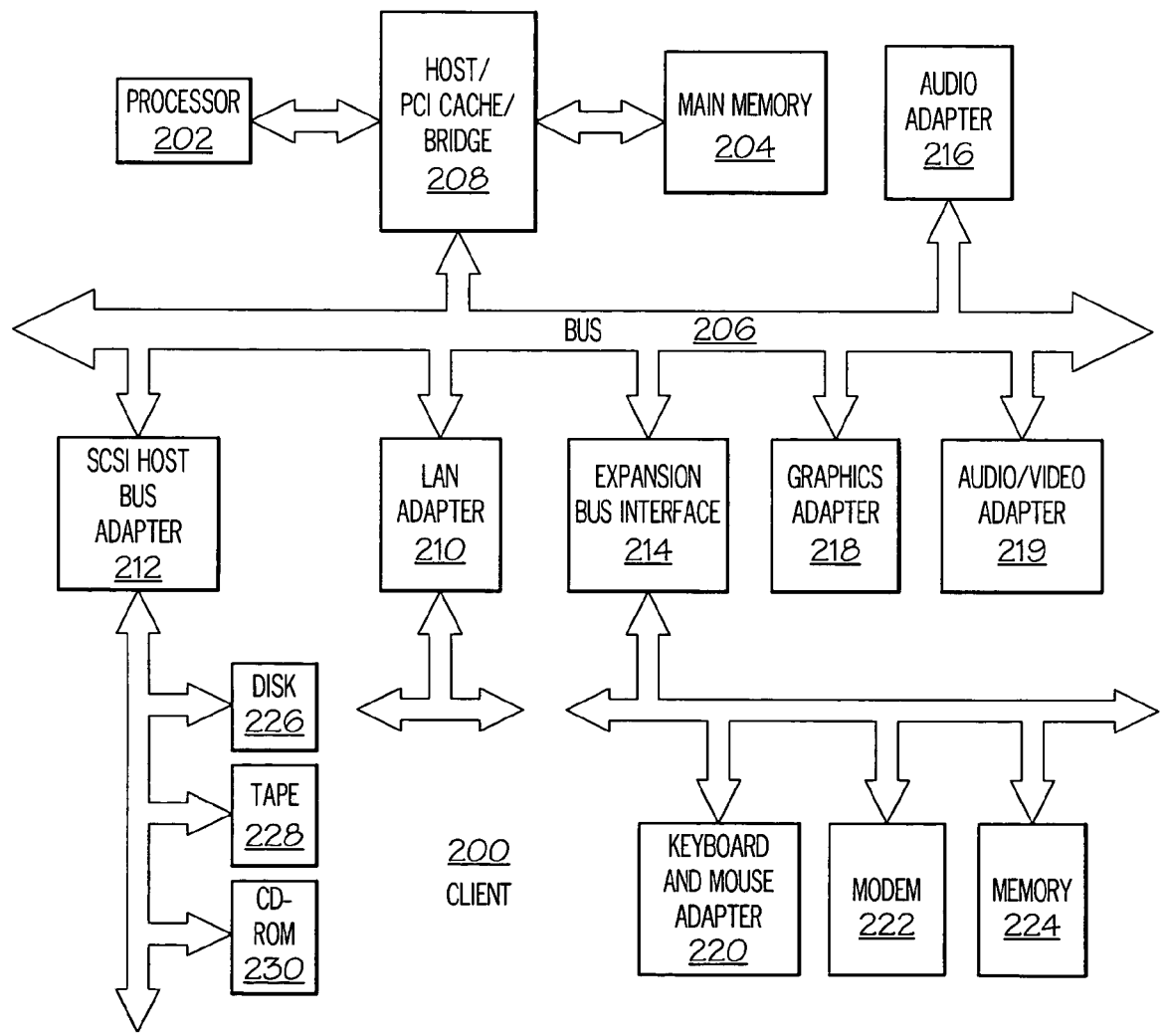
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Using components of a data processing system, such as the example in FIG. 2, the present invention may be implemented as a solution to detect and reduce database contention and deadlock caused from within an application server. The database may be located on storage devices, such as hard disk drive 226, tape drive 228, or CD-ROM 230, and may me loaded into main memory 204, or additional memory 224, for execution by processor 202. The mechanism of the present invention detects the presence of database contention or deadlock from within the application server, which may be loaded into main memory 204 for execution by processor 202. Then the mechanism of the present invention alerts the application server administrator, possibly through graphics adapter 218 or audio/video adapter 219, to the problem so that they can communicate the issue with the database administrator. Additionally, the mechanism of the present invention tunes the application server during runtime so that the server avoids contention, but maintains a sufficient workload. In summary, the mechanism of the present invention maintains performance and alerts the application server administrator to the contention or deadlock issue so that they can resolve an optimal solution with the database administrator.

Figure 3:
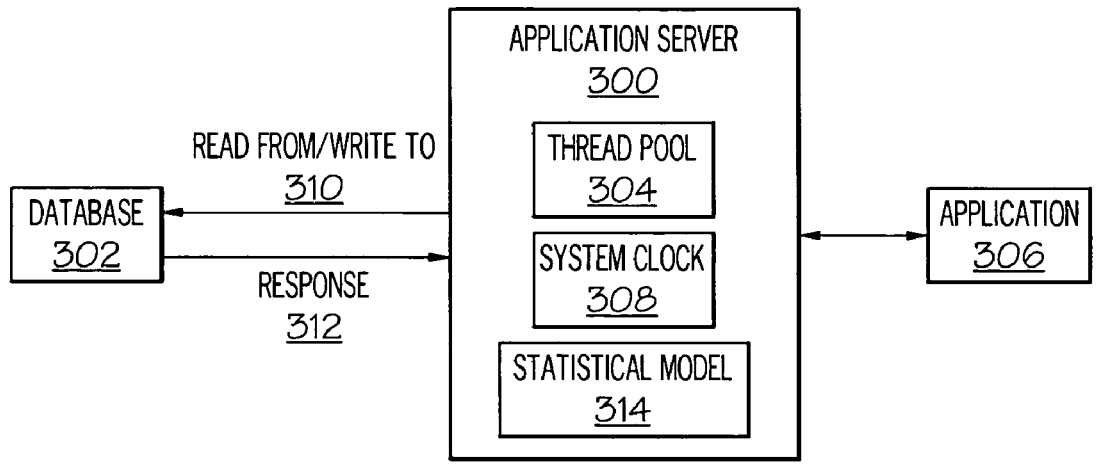
FIG. 3 is a block diagram of data processing system components for detecting and reducing database contention and deadlock caused from within an application server in accordance with a preferred embodiment of the present invention.

FIG. 3 is a block diagram of an example of data processing system components for detecting and reducing database contention and deadlock within application servers, in accordance with a preferred embodiment of the present invention. The mechanism of the present invention operates within application server 300 to detect deadlock and contention within a database 302. Deadlock occurs when two threads in thread pool 304 are sharing database 302 and both decide to wait for exclusive access, such that neither thread gains access. One parameter in statistical model 314 monitored by the mechanism of the present invention is whether database 302 is deadlocked for a thread in thread pool 304. In these illustrative examples, contention is competition between threads in thread pool 304 for use of database 302 that results in delayed access to database 302. Contention is indicated by a variety of additional parameters that are monitored in statistical model 314, such as thread pool use, time spent waiting for a thread to be assigned, number of time-outs, deadlocks, time spent waiting for a response, whether a response is close to a time-out, and the level and type of workload. When application server 300 assigns a thread in thread pool 304 for use by application 306, system clock 308 is used to measure the time spent waiting for a thread to be assigned, which is another parameter in statistical model 314 used to detect contention. The number of threads used in the thread pool 304 is another parameter in statistical model 314 used to detect contention. The level and type of workload to which application server 300 is subjected is another parameter is statistical model 314. A specific workload type is a generalization of the type of requests, work items or jobs to which application server 300 is subject. The level of a workload is the quantity of a certain workload to which application server 300 is subject. When application server 300 reads from or writes to 310 database 302, system clock 308 is used to measure the time spent waiting for response 312, which is another parameter in statistical model 314 used to detect contention. If application server 300 does not detect response 312 within the amount of time allotted for response 312, a time-out has occurred. The mechanism of the present invention monitors time-outs as another parameter in statistical model 314 to detect contention. Even if application server 300 uses system clock 308 to detect response 312 within the amount of time allotted for response 312, the time spent waiting for response 312 is another parameter in statistical model 314 used to detect contention. System clock 308 is used to measure whether response 312 was received close to a time-out, which is another parameter in statistical model 314 used to detect contention.

Figure 4:
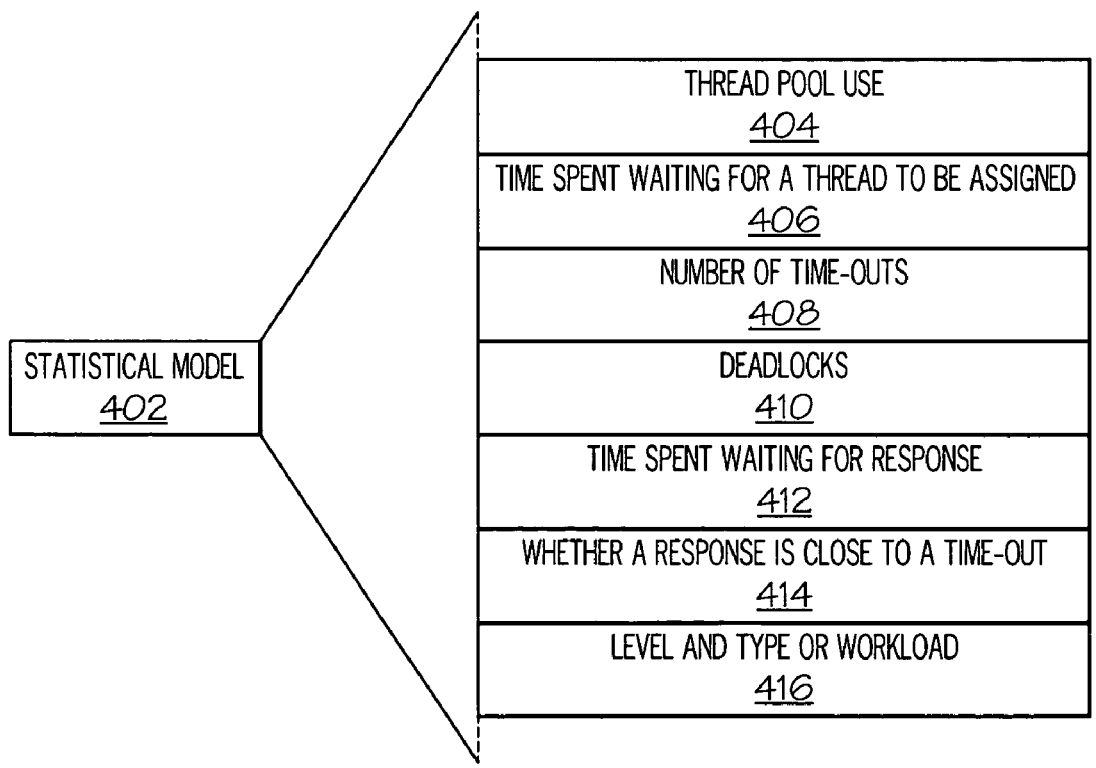
FIG. 4 is a block diagram of the statistical model components for detecting and reducing database contention and deadlock caused from within an application server in accordance with a preferred embodiment of the present invention.

FIG. 4 is a block diagram of an example of statistical model components for detecting and reducing database contention and deadlock within application servers, in accordance with a preferred embodiment of the present invention. The mechanism of the present invention constructs a statistical model 402 to analyze and measure the amount of contention in the system. The statistical model 402 does this by monitoring and performing thread analysis of various statistics that represent the application server's current and historical states. These statistics can include, but are not limited to workload level and type 416, thread pool use 404, time spent waiting for a thread to be assigned 406, the number of time-outs 408, and of course deadlocks 410. The mechanism of the present invention also monitors time spent waiting for a response 412, and whether the response is close to the time-out 414 consistently. The mechanism of the present invention also monitors historical trends of statistical model 402, such as whether or not there has been a sudden increase in time spent waiting for a response 412 that is not accompanied by a sudden change or increase in level and type of workload 416. This response monitoring is accomplished by looking over time at response times in thread pools and wait times in thread pools, such as the database connection pools. Analysis of the time spent waiting for a response can help determine if there is a contention problem outside the application server.

Figure 5:
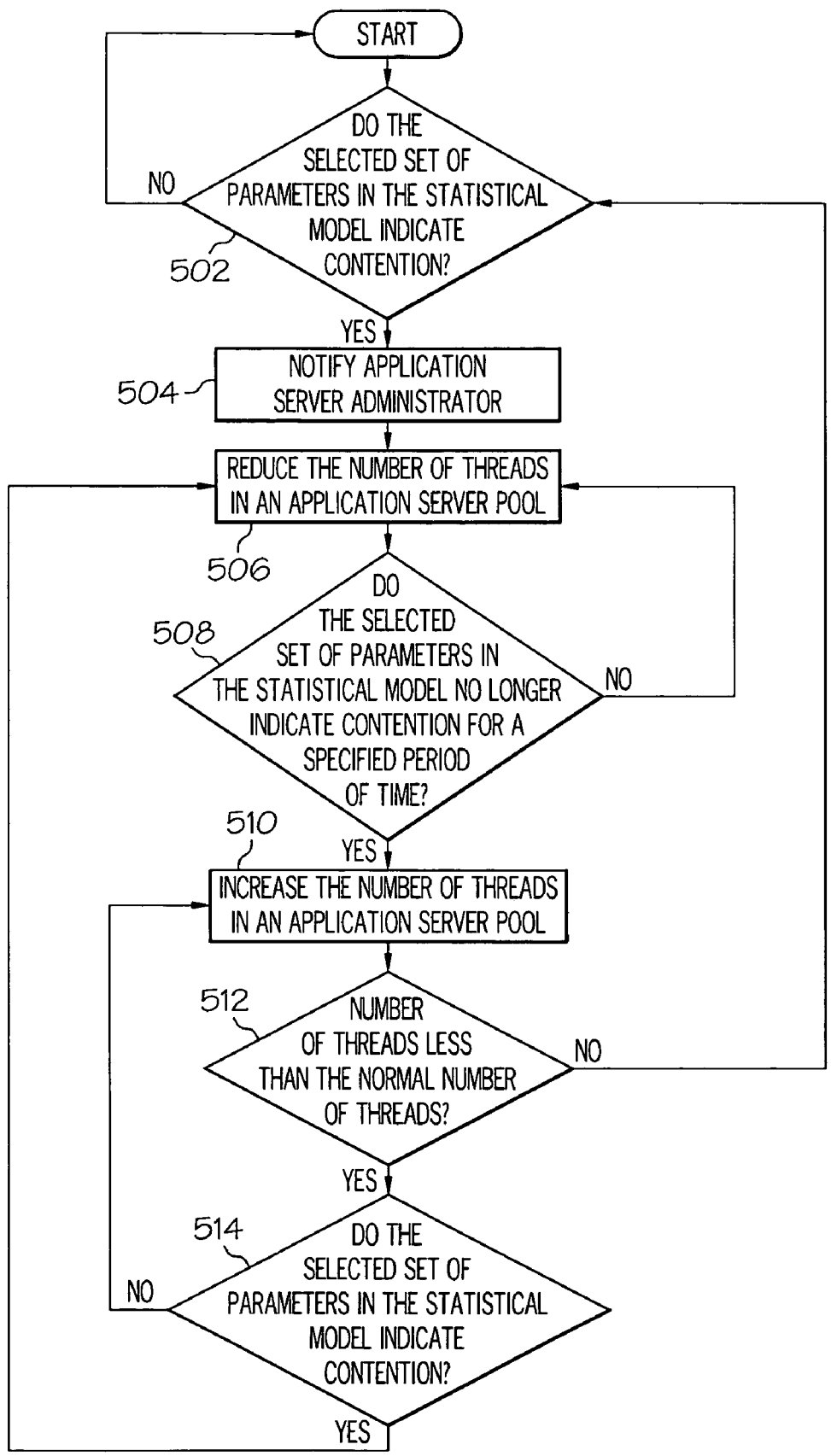
FIG. 5 is a flowchart of the process for detecting and reducing database contention and deadlock caused from within an application server in accordance with a preferred embodiment of the present invention.

FIG. 5 is a flowchart of the process for detecting and reducing database contention and deadlock within application servers, such as application server 300 in FIG. 3, in accordance with a preferred embodiment of the present invention. The mechanism of the present invention determines if a set of specified parameters in the statistical model, such as statistical model 402 in FIG. 4, indicates that a level of contention is reached that is undesirable, as shown in step 502 in FIG. 5. For example, if over a selected time period the amount of time spent waiting for a response is a selected percentage, such as 25%, greater than the average wait time or greater than an unacceptable wait time, the parameter that represents time spent waiting for a response indicates that a level of contention is reached that is undesirable. As illustrated in this example, the set of parameters in the statistical model that indicate contention is one or more parameters in the statistical model.

The set of parameters in the statistical model that indicate contention could be a selected combination of parameters. As another example, over a selected time period the amount of time spent waiting for a response is a certain amount, such as 10%, greater than the average wait time, but less than the selected percentage greater, such as 25%, than the average wait time. The parameter that represents time spent waiting for a response specifies that although the wait time for a response is 10% greater than average, the wait time for a response is not sufficiently greater (25%) to indicate contention by itself. However, if this parameter indicates that the wait time for a response is 10% greater than average and the parameter that represents thread pool use indicates thread pool use that is a certain amount, such as 20%, greater than average, but insufficient to indicate contention by itself, then the set of both parameters may be sufficient to indicate that the level of contention reached is undesirable.

As an another example, if an application server is subject to a consistent type of workload whose level is slightly increased, such as 15%, and that slight increase results in a significant increase in response time from the database, such as 200%, then the set of both parameters may be sufficient to indicate that the application has introduced an undesirable level of contention in the database.

If the set of specified parameters in the statistical model indicates that a level of contention is reached that is undesirable, the mechanism of the present invention notifies the application server administrator, as shown in step 504. The mechanism of the present invention also attempts to maintain application server functionality while the root cause is determined. The notification of the application server administrator and the attempts to temporarily resolve the situation can also be triggered by a set of trends involving specified parameters in the statistical model, not just the set of specified parameters in the statistical model.

Actions that the mechanism of the present invention can take to resolve the situation include, in addition to notifying the application server administrator, as shown in step 504, generally reducing the level of contention in the database and in application server pools. The general idea is to allow only enough threads to service inexpensive (quickly processed) and expensive (slowly processed) incoming requests. By reducing the number of threads in an application server pool to this minimal level, contention is often significantly reduced, as shown in step 506.

When contention is sufficiently reduced for a specified period of continuous time, the mechanism of the present invention will perform incremental increases in thread pool sizes periodically until a normal mode of operation is reached, or until an undesirable level of contention is established. If a thread pool size is reached that results in an undesirable level of contention the threads will again be reduced below that point of contention. The mechanism of the present invention establishes if the statistical model that initially indicated contention no longer indicates contention for a specified period of continuous time, as shown in step 508. If the statistical model that initially indicated contention continues to indicate contention, the mechanism of the present invention continues to reduce the number of threads in an application server pool. If the statistical model that initially indicated contention no longer indicates contention for a specified period of continuous time, the mechanism of the present invention increases the number of threads in an application server pool, as shown in step 510. If the number of threads equals the normal number of threads, the mechanism of the present invention returns to normal operation, as shown in step 512. If the number of threads does not equal the normal number of threads, the mechanism of the present invention resolves if the statistical model that initially indicated contention no longer indicates contention, as shown in step 514. If the statistical model that initially indicated contention no longer indicates contention, the mechanism of the present invention increases the number of threads. If the statistical model that initially indicated contention indicates contention, the mechanism of the present invention decreases the number of threads.

Optionally, the return to normal is executed by the application server administrator when this individual decides that the root case of contention has not only been determined, but also remedied, or the root cause of contention needs to be reproduced for further analysis.

Therefore, the mechanism of the present invention, described above, detects and reduces database contention and deadlock caused from within an application server by notifying application server administrators and tuning the application server during runtime.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described-in order to best explain the principles of the invention, the practical application, and to enable others of ordinary skill in the art to understand the invention for various embodiments with various modifications as are suited to the particular use contemplated.

What is claimed is:

1. A method in a data processing system for detecting and reducing database contention caused from within an application server, the method comprising:

determining if a set of parameters in a statistical model indicates contention, wherein the statistical model includes a parameter for level and type of workload;

responsive to determining the set of parameters in the statistical model indicates contention, reducing a number of threads in an application server pool;

establishing whether the set of parameters in the statistical model indicates contention is reduced for a specified period of continuous time;

responsive to establishing the set of parameters in the statistical model does not indicate contention is reduced for the specified period of continuous time, returning to the reducing step;

responsive to establishing the set of parameters in the statistical model indicates contention is reduced for the specified period of continuous time, increasing the number of threads in the application server pool;

verifying whether the number of threads is less than a normal number of threads;

responsive to verifying the number of threads is not less than the normal number of threads, returning to the determining step;

responsive to verifying the number of threads is less than the normal number of threads, resolving if the set of parameters in the statistical model indicates contention;

responsive to resolving the set of parameters in the statistical model indicates contention, returning to the reducing step; and responsive to resolving the set of parameters in the statistical model does not indicate contention, returning to the increasing step.

2. The method of claim 1 further comprising:
responsive to reducing the number of threads in the application server pool, notifying an application server administrator.

3. The method of claim 1 further comprising:
determining if a set of trends involving parameters in the statistical model indicates contention instead of determining if the set of parameters in the statistical model indicates contention.

4. The method of claim 1 wherein the statistical model includes a parameter for thread pool use.

5. The method of claim 1 wherein the statistical model includes a parameter for time spent waiting for a thread to be assigned.

6. The method of claim 1 wherein the statistical model includes a parameter for a number of time-outs.

7. The method of claim 1 wherein the statistical model includes a parameter for deadlocks.

8. The method of claim 1 wherein the statistical model includes a parameter for time spent waiting for a response.

9. The method of claim 1 wherein the statistical model includes a parameter for whether a response is close to a time-out.

* * * * *